United States Patent [19]
Olson

[11] 3,851,896
[45] Dec. 3, 1974

[54] IN-LINE EMITTER FOR HOSE
[76] Inventor: Donald O. Olson, 5885 Darmouth St., Chula Vista, Calif. 92010
[22] Filed: Sept. 24, 1973
[21] Appl. No.: 399,866

[52] U.S. Cl............................ 285/14, 61/12
[51] Int. Cl.......................... F16l 55/00
[58] Field of Search ............... 61/10, 11, 12, 13; 137/608; 285/13, 14, 239, 259

[56] References Cited
UNITED STATES PATENTS
2,946,839  7/1960  Horning............................ 285/14 X
3,604,728  9/1971  Symcha et al. ..................... 285/14
3,693,657  9/1972  Olson................................ 137/608
3,792,588  2/1974  Gilaad................................ 61/12

Primary Examiner—Paul R. Gilliam
Assistant Examiner—David H. Corbin
Attorney, Agent, or Firm—Owen, Wickersham & Erickson

[57] ABSTRACT

A fluid emitter of the kind used in irrigation comprises a tubular member which is inserted into the adjacent ends of two hose sections. A helical thread on the outside of the tubular member co-acts with the inside surface of a hose to provide a flow restricting passageway. A slotted inlet flange screens the inlet, and a slotted flange between the hose ends prevents the hose ends from blocking the outlet.

4 Claims, 5 Drawing Figures

PATENTED DEC 3 1974 3,851,896
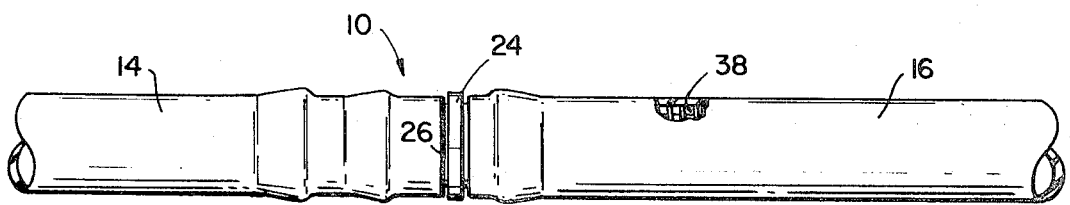
FIG_1
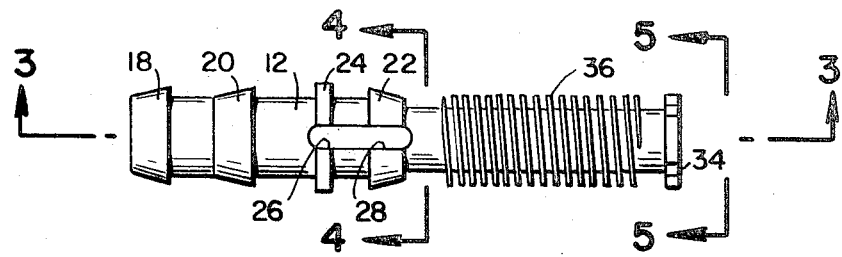
FIG_2
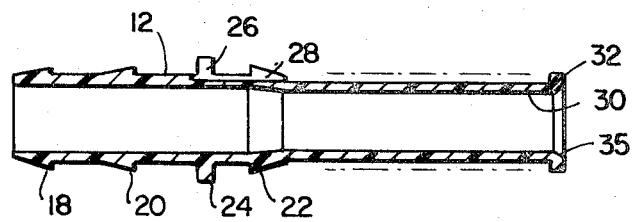
FIG_3
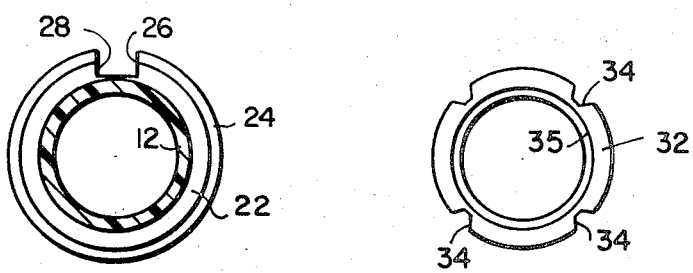
FIG_4   FIG_5

IN-LINE EMITTER FOR HOSE

BACKGROUND OF THE INVENTION

This invention relates to an irrigation system in which water or other fluid is discharged at low rates and in a plurality of fixed locations. It relates particularly to a flow restricting fluid emitter for controlling the discharge of fluid at those spots.

A fluid emitter of the general kind to which this invention relates is disclosed in my U.S. Pat. No. 3,693,657 issued Sept. 26, 1972.

In irrigation systems of the kind to which this invention relates the fluid is conducted through pipes or hoses. The fluid emitters of the present invention are connected in the hoses at spaced locations to provide a slow, restricted or drip flow of fluid to the area to be irrigated.

To achieve the desired slow rate of fluid discharge from the hoses, each fluid emitter has an elongated, flow restricting channel of quite small cross-sectional area. An inlet for the channel is connected to the relatively large internal diameter of the hose, and an outlet opens to the ground outside the emitter. Because the flow restricting channel is so narrow, it can be easily clogged by contaminants, such as rust, dirt, sand and the like. The inlet for the flow restricting channel should therefore have some means for blocking off or otherwise preventing such clogging materials from getting into the narrow flow restricting channel.

In many irrigation systems a large number of individual emitters are required. The expenses involved in manufacturing and installing the emitters are therefore important factors. The emitter should be constructed so that it can be made at low cost, and the emitter should also be easily and quickly installed in the field.

SUMMARY OF THE INVENTION

It is a primary object of the present invention to construct a fluid emitter which meets the requirements noted above. It is a closely related object to construct an in-line emitter which is inserted in the hose.

The fluid emitter of the present invention is a tubular member which is inserted within the adjacent ends of two hose sections. The tubular member has a relatively large diameter inner bore for permitting the bulk of the water flowing through the hoses to pass through the tubular member.

A helical thread is formed on the outside of one end part of the tubular member. When this end part of the tubular member is inserted in a related hose section, the helical thread engages the inside surface if the hose section to form a long, narrow, helically extending passageway for restricting the flow of the fluid to be emitted.

A radially extending flange is located at the inlet end of the helical passageway. This flange also engages the inside surface of the hose section to serve as a screen for blocking out clogging materials such as sand particles, which could otherwise flow into the helical passageway. A number of narrow width slots in the flange permit the fluid to flow into the helical passageway.

The hose sections are retained on the tubular member by radially projecting barbs. A central flange is located between the barbs and acts as a stop for the hose ends.

The barb for the hose end that extends over the helical threads has an axially extending slot which is aligned with a similar slot in the central flange to provide the outlet for the fluid flowing through the helical passageway.

Fluid emitter apparatus and methods which incorporate the structure and techniques described above and which are effective to function as described above constitute specific objects of this invention.

Other objects, advantages and features of my invention will become apparent from the following detailed description of one preferred embodiment taken with the accompanying drawings.

BRIEF DESCRIPTION OF THE DRAWINGS

FIG. 1. is a top plan view of a fluid emitter constructed in accordance with an embodiment of the present invention and shows the emitter installed in the hose;

FIG. 2. is a top plan view of the fluid emitter but without the hose section shown in FIG. 1;

FIG. 3. is an elevation view in cross-section taken along the line and in the direction indicated by the arrows 3—3 in FIG. 2;

FIG. 4. is an enlarged end elevation view taken along the line and in the direction indicated by the arrows 4—4 in FIG. 2; and FIG. 5. is an enlarged end elevation view taken along the line and in the direction indicated by the arrows 5—5 in FIG. 2.

DESCRIPTION OF THE PREFERRED EMBODIMENTS

A fluid emitter constructed in accordance with one embodiment of the present invention is indicated generally by the reference numeral 10 in FIG. 1.

As best shown in FIGS. 2 and 3, the fluid emitter comprises a tubular member 12. The tubular member is inserted in the adjacent ends of hose sections 14 and 16.

The tubular member is preferably made by molding a plastic, such as polypropelene; and the hose sections 14 and 16 may be constructed of heat shrink material so that the ends of the hoses can be shrunk in place after the tubular member 12 is installed.

The tubular member has a pair of radially projecting barbs 18 and 20 on one end part of the member for retaining the hose 14 in place and an oppositely directed barb 22 on the other end part of the tubular member for retaining the hose 16 in place.

The tubular member has a radially projecting flange 24 formed in the central part of the tubular member. This flange 24 acts as a stop for engaging the ends of the hoses 14 and 16.

The flange 24 also has a slot 26 which extends axially through the width of the flange. This slot serves as part of the outlet means for the flow restricting passageway of the emitter as willl be described in greater detail below.

As best shown in FIG. 2 the slot 26 in the flange 24 is aligned with a similar slot 28 in the barb 22. In the molding operation the slots 26 and 28 are actually formed as one continous slot with a slight recess as illustrated in the outer periphery of the tubular member.

The tubular member 12 has a relatively large diameter inner bore 30, and most of the fluid flowing through the hoses 16 and 14 passes through this inner bore of the tubular member.

The inlet end (right-hand end as viewed in FIGS. 1–3) of the fluid emitter has a radially extending flange 32 which is substantially the same diameter as the inside diameter of the hose 16 so that the periphery of this flange engages the inside surface of the hose.

As best shown in FIGS. 2 and 5, the flange 32 has a plurality of slots 34 which extend axially through the flange to admit fluid to the flow restricting passageway. The flange 32 acts as a barrier or screen to keep clogging materials, such as sand particles, from getting into the narrow flow restricting passageway of the emitter.

The inlet end of the emitter may also preferably be formed with a bevel 35 as illustrated for providing smooth flow at this end of the tubular member.

The flow restricting passageway is provided by a helically extending thread 36 formed on the outer periphery of the tubular member. This thread is located in the area between the end flange 32 and the hose barb 22.

The outside periphery of the thread 36 engages the inside surface of the hose 16 to form a helical passageway 38 (see FIG. 1) of extended length and narrow width. This provides the flow restriction required for the drip type fluid emitter operation.

A part of the fluid flowing through the hose 16 thus passes through the slots 34 and into the inlet end of the flow restricting passageway 38. The fluid leaving the outlet end of the flow restricting passageway 38 passes through the slots 28 and 26 in the barb 22 and central stop flange 24 and out to the ground around the emitter. The end flange 32 serves as a screen for the inlet and the slots 26 and stop flange 24 provide an outlet which cannot be inadvertently blocked by pushing either of the hose sections 14 or 16 too far onto the tubular member 12.

The present invention thus provides an emitter which can be manufactured and installed in large numbers at low cost to the user.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A flow restricting emitter of the kind used in irrigation, said emitter comprising, a one-piece tubular member having a relatively large diameter inner bore, a first end insertable within the end of a first hose section, a second end insertable within the end of a second hose section, a radially extending stop flange on the outer surface of the tubular member at the juncture of the first and second ends and having a first side surface engageable with the end of the first hose section and a second side surface engageable with the end of the second hose section to thereby prevent the hose sections from being pushed too far over either end of the tubular member, hose retaining means on the outer surface of the tubular member for retaining the first and second hose sections in place on the tubular member, radially extending flow restricting means formed on the outer surface of said first end and having an outer periphery engageable with the inner surface of the first hose section to define a flow passageway of extended length and restricted cross-sectional area between the outer surface of the first end of the tubular member and the inner surface of the first hose section, inlet means for conducting fluid from the first hose section to the inlet of the passageway, and outlet means for conducting fluid from the outlet of the passageway and between the adjacent ends of the hose sections, said outlet means including a slot extending radially through the stop flange, said hose retaining means include first barb means on said first end and second barb means on said second end and wherein the first barb means are located at the downstream end of the flow passageway between the end of the flow passageway and said stop flange and including a radially extending slot formed in the first barb means and aligned axially and radially with the slot in the stop flange.

2. The invention defined in claim 1 wherein the slots in the first barb means and in the stop flange are formed as one continuous slot with a slight recess in the outer periphery of the tubular member.

3. The invention defined in claim 1 wherein said inlet means include a radially projecting flange at the upstream end of the flow passageway having an outer periphery engageable with the inner surface of the first hose section and having a plurality of narrow width slots extending through the flange so that the flange serves as a screen for the inlet to the flow restricting passageway for blocking out materials which could clog the restricted cross-sectional area of the flow passageway.

4. The invention defined in claim 1 wherein the hose ends are heat shrink tubing.

* * * * *